United States Patent [19]

Suzuki et al.

[11] Patent Number: 5,684,923

[45] Date of Patent: Nov. 4, 1997

[54] METHODS AND APPARATUS FOR COMPRESSING AND QUANTIZING SIGNALS

[75] Inventors: Hiroshi Suzuki, Saitama; Makoto Akune, Tokyo, both of Japan

[73] Assignee: Sony Corporation, Japan

[21] Appl. No.: 358,991

[22] Filed: Dec. 16, 1994

Related U.S. Application Data

[63] Continuation of Ser. No. 149,293, Nov. 9, 1993, abandoned.

[30] Foreign Application Priority Data

Nov. 11, 1992 [JP] Japan ................................ 4-300947

[51] Int. Cl.$^6$ ........................................ G10L 3/02
[52] U.S. Cl. ................... 395/2.38; 395/2.12; 395/2.33; 395/2.39; 395/2.72; 395/2.78; 395/2.91; 395/2.92
[58] Field of Search ................... 395/2.12, 2.13, 395/2.25, 2.33, 2.38, 2.39, 2.72, 2.78, 2.91, 2.92

[56] References Cited

U.S. PATENT DOCUMENTS

| 4,002,841 | 1/1977 | Ching et al. ........................... 370/81 |
| --- | --- | --- |
| 4,184,049 | 1/1980 | Crochiere et al. ..................... 381/31 |
| 4,455,649 | 6/1984 | Esteban et al. ..................... 381/31 X |
| 4,516,241 | 5/1985 | Farah et al. ....................... 370/110.1 |
| 4,535,472 | 8/1985 | Tomeik ................................. 381/31 |
| 4,573,187 | 2/1986 | Bui et al. .......................... 381/35 X |
| 4,870,685 | 9/1989 | Kadokawa et al. ................... 381/31 |
| 4,872,132 | 10/1989 | Retter ................................. 364/748 |
| 4,885,790 | 12/1989 | McAulay et al. ..................... 381/36 |
| 4,896,362 | 1/1990 | Veldhuis et al. ..................... 381/41 |
| 4,932,062 | 6/1990 | Hamilton .............................. 381/46 |
| 4,972,484 | 11/1990 | Thiele et al. ........................ 381/37 |
| 4,991,213 | 2/1991 | Wilson ................................. 381/34 |
| 5,049,992 | 9/1991 | Citta et al. .......................... 358/140 |
| 5,109,417 | 4/1992 | Fielder et al. ....................... 381/29 |
| 5,115,240 | 5/1992 | Fujiwara et al. ..................... 341/51 |
| 5,117,228 | 5/1992 | Fuchigami et al. ................... 341/51 |
| 5,134,475 | 7/1992 | Johnston et al. ..................... 375/133 |
| 5,142,656 | 8/1992 | Fielder et al. ....................... 381/37 |
| 5,151,941 | 9/1992 | Nishiguchi et al. ................... 381/46 |
| 5,157,760 | 10/1992 | Akagiri ................................. 395/2 |
| 5,166,686 | 11/1992 | Sugiyama .......................... 341/155 |
| 5,199,078 | 3/1993 | Orgimeister ......................... 381/47 |
| 5,214,741 | 5/1993 | Akamine et al. ...................... 395/2 |
| 5,231,484 | 7/1993 | Gonzales et al. .................... 358/133 |
| 5,301,205 | 4/1994 | Tsutsui et al. ....................... 375/200 |
| 5,621,856 | 4/1997 | Akagiri .............................. 395/2.38 |

FOREIGN PATENT DOCUMENTS

| 0 145 788 A1 | 6/1985 | European Pat. Off. ......... H04B 12/02 |
| --- | --- | --- |
| 0 255 111 A2 | 2/1988 | European Pat. Off. ......... G11B 20/10 |
| 0 409 248 A2 | 1/1991 | European Pat. Off. ......... H03M 7/30 |
| 0 420 745 A2 | 4/1991 | European Pat. Off. .......... H04B 1/66 |
| 0 423 050 A1 | 4/1991 | European Pat. Off. .......... H04B 1/66 |
| 0 525 809 A2 | 2/1993 | European Pat. Off. .......... H04B 1/66 |

OTHER PUBLICATIONS

McAulay et al. "The Application of Subband Coding to Improve Quality and Robustnes of the Sinusoidal Transform Coder." ICASSP '93: Acoustics, Speech & Signal Processing Conference, pp. II439–II442 Apr. 1993.

(List continued on next page.)

Primary Examiner—Allen R. MacDonald
Assistant Examiner—Alphonso A. Collins
Attorney, Agent, or Firm—Limbach & Limbach L.L.P.

[57] ABSTRACT

A high efficiency coding method and apparatus includes quantization which takes into account correlation of input signals of plural channels in coding the input signals of the respective channels simultaneously. In the high efficiency coding method and apparatus, spectrum data from MDCT circuits or coefficient data are transmitted to another channel via an other-channel transmission circuit, and data from another channel are transmitted to correlation adaption circuits. The data from correlation adaption on circuits are transmitted to adaptive bit allocation circuits, respectively, wherein bit allocation in coding of the input signals of one channel takes into account the input signals of another channel.

32 Claims, 3 Drawing Sheets

OTHER PUBLICATIONS

Teh et al. "Subband Coding of High–Fidelity Quality Audio Signals at 128 KPBS." ICASSP '92: Acoustics, Speech & Signal Processing Conference, pp. II197–II200 Sep. 1992.

ICASSP '89 vol. 3, May 1989, NY, USA pp. 1993–1996, XP000089272 Johnston 'Perceptual Transform Coding of Wideband Stereo Signals'* p. 1; figure 2*.

IEEE Journal on Selected Areas in Communication vol. 10, No. 5, Jun. 1992, New York US pp. 796–818, XP000274716 Jayant 'Signal Compression: Technology Targets and Research Directions' * p. 806, right column, line 21 –line 36; figure 11C*.

Brandenburg et al., "Aspec: Adaptive Spectral Entropy Coding of High Quality Music Signals," Audio Engineering Society Preprint No. 3011 (1991 Feb.).

Davidson et al., "Low Compleity Transform Coder for Satellite Link Applications" Audio Engineering Society Preprint No. 2966 (1990 Sep.).

Esteban et al., "Application of Quadrature Mirror Filters To Split Band Voice Coding Schemes," Record of the 1977 ICASSP, pp. 191–195 (1977 May).

Johnston, "Transform Coding of Audio Signals Using Perceptual Noise Criteria," 6 IEEE Trans. on Selected Areas in Communications, 314–323 (1988 Feb.).

Rothweiler, "Polyphase Quadrature Filters–A New Subband Coding Technique," 3 Proc. 1983 ICASSP 1280–1283 (1983 Apr.).

Schroeder et al., "High Quality Digital Audio Encoding with 3.0 Bits/Sample Using Adaptive Transform Coding," Audio Engineering Society Reprint No. 2321 (1986 Mar.).

Stoll et al., "Making–Pattern Adapted Sub–Band Coding: Use of the Dynamic Bit–Rate Margin," Audio Engineering Society Preprint No. 2585 (1988 Mar.).

Thiele et al., "Low Bit–Rate Coding of High–Quality Audio Signals—An Introduction to MASCAM System," 230 EBU Technical Review 71–93 (1988 Aug.).

Y. Mahieux & J.P. Petit, "Transform Coding of Audio Signals at 64 kbit/s," Globecom 90, vol. 1, pp. 518–522 (Dec. 1990).

Michael A. Krasner: "The Critical Band Coder—Digital Encoding of Speech Signals Based on the Perceptual Requiremens of the Auditory System," MIT Lincoln Laboratory, Lexington, MA, 1980 IEEE, pp. 327–331.

METHODS AND APPARATUS FOR COMPRESSING AND QUANTIZING SIGNALS

This is a continuation of co-pending application Ser. No. 08/149,293 filed on Nov. 9, 1993, now abandoned.

BACKGROUND OF THE INVENTION

1. Field of the Invention

This invention relates to a high efficiency coding method and apparatus for compressing and quantizing input signals, and more particularly, to a high efficiency coding method and apparatus for simultaneously compressing input signals of plural channels and quantizing them.

2. Description of the Related Art

A variety of high efficiency coding techniques for audio signals or speech signals are known. For example, a technique of carrying out fixed bit allocation by utilizing auditory sense masking to provide necessary Signal-to-noise ratios for respective bands is disclosed in M. A. Kransner MIT, The critical band coder—digital encoding of the perceptual requirements of the auditory system, ICASSP 1980. With this technique, however, since the bit allocation is fixed when measuring the characteristics with a sine wave input, it is not possible to have a good characteristics value.

In order to solve this problem, there is proposed a high efficiency coding apparatus in which all the bits usable for bit allocation are divided for use into bits of a fixed bit allocation pattern determined in advance for every small block and into bits for carrying out bit allocation dependent upon magnitudes of signals of respective blocks, so as to allow the division ratio to be dependent upon a signal related to an input signal, thus allowing the division ratio for the fixed bit allocation pattern to be greater as the spectrum of the signal becomes smoother.

According to this method, in case energy is concentrated on a specific spectrum component as in the case of a sine wave input, allocation of a larger number of bits to a block including that spectrum component makes it possible to remarkably improve the entire signal-to-noise characteristics. Generally, the human auditory sense is extremely sensitive to a signal having a steep spectrum component. Therefore, the improvement in the signal-to-noise characteristics using such a method not only leads to an improvement in a numerical value in measurement, but also is effective for an improvement in the sound quality from a viewpoint of the auditory sense.

However, if allocation of bits dependent upon input signals is carried out simply on the basis of an improvement in the signal-to-noise characteristics, when attempting to compress a signal including a large number of steep spectrum components, such as the sound of a triangle, at a low bit rate, sufficient bits cannot be allocated to blocks corresponding to respective spectrum components, thus failing to provide sufficiently high sound quality from a viewpoint of the auditory sense.

In view of the above, the present Assignee has proposed, in the U.S. patent application Ser. No. 08/011,376, filed on Jan. 29, 1993, a technique in which all the bits usable for bit allocation are divided for use into bits of a fixed bit allocation pattern determined in advance for any short time and bits for carrying out bit allocation dependent upon the magnitudes of signals of respective blocks, thus carrying out the bit allocation such that weighting is conducted in accordance with corresponding bands of blocks for the bit allocation dependent upon magnitudes of signals of respective blocks as well as the fixed bit allocation pattern.

However, in all the above techniques, quantization is carried out only for input signals of the corresponding channel. Therefore, if the above techniques are applied to an apparatus having plural channels, at the same compression rate as in the case of a single channel, the results will be as follows. That is, while preferable results may be obtained in case input signals of the respective channels are of strong correlation with each other, differences of quantization errors may be generated between channels in case signals of weak correlation are inputted, thus affecting stationary quality of a sound image.

OBJECT AND SUMMARY OF THE INVENTION

In view of the above-mentioned status of the art, it is an object of the present invention to provide a high efficiency coding method and apparatus, by which the quantization noise volume between respective channels is controlled in case input signals of plural channels are supplied, thereby optimally realizing stationary quality of a sound image.

The present invention provides a high efficiency coding method and apparatus for compressing and quantizing input signals of plural channels, the method and apparatus including changing power of an analysis spectrum used for bit allocation on the basis of correlation between plural channels, so as to carry out bit allocation, thus realizing quantization corresponding to the correlation between the channels.

The correlation between the channels used in this bit allocation is preferably given as a numerical value dependent upon the input signals. However, the correlation may take a fixed value, or may take a value produced in consideration of the value dependent upon the input signals and the fixed value, at a constant or Variable ratio. In addition, preferable results may also be obtained by changing respective coefficients for bit allocation.

The correlation used in this change of coefficients may be found from spectrum data on the frequency axis of the input signal or coefficient data at the time of orthogonal transform, or may be found from floating information as part of quantization results.

According to the present invention, in realizing efficient bit allocation conforming to the auditory sense in encoding input signals of plural channels, deterioration in stationary quality of a sound image due to the difference in quantization errors between the respective channels can be avoided. In addition, masking effects can be utilized more efficiently than before because of the tendency that a generated quantization noise concentrates in a portion wherein the stationary quality of the sound image concentrates. Accordingly, it is possible to encode music signals of high quality at a lower bit rate.

DESCRIPTION OF THE PREFERRED EMBODIMENT

A preferred embodiment of the high efficiency coding method and apparatus according to the present invention will now be described with reference to the accompanying drawings.

First, a technique of high efficiency coding of input digital signals such as audio PCM signals, using techniques of so-called Subband Coding (SBC), Adaptive Transform Coding (ATC) and Adaptive Bit Allocation (APC-AB), is described with reference to FIG. 1.

In the high efficiency coding apparatus of the present embodiment, quantization taking account of correlation between respective channels is carried out in compressing input audio PCM signals of plural channels simultaneously. The correlation between the respective channels may be found by constantly calculating from the input signals, or may be found from spectrum data of the input signals on the time axis or coefficient data at the time of orthogonal transform, or may be found from floating information of another channel. Also, quantization may be carried out on the basis of constant correlation regardless of the input signals. Further, quantization may be carried out in consideration of the correlation dependent upon the input signals and the constant correlation, at a variable ratio.

In the high efficiency coding apparatus, concretely shown in FIG. 1, an input digital signal is divided in frequency into plural frequency bands by using filters, and orthogonal transform is carried out for each of the respective frequency bands, thereby implementing adaptive bit allocation and encoding of resulting spectrum data on the frequency axis for every so-called critical band, as later described, taking account of characteristics of human auditory sense. It is a matter of course that the frequency band divisional width of non-block division by means of filters may be an equal divisional width.

Further, in the embodiment of this invention, the block size (block length) is adaptively changed in accordance with an input signal before orthogonal transform, and floating processing is carried out for every critical band or for every block formed by further subdividing the critical band on the higher frequency band. This critical band is a frequency band divided in consideration of the characteristics of the human auditory sense, that is, a band of a narrow band noise at the time when a pure sound is masked by that noise having the same intensity as that of the pure sound in the vicinity of a frequency thereof. In this critical band, the bandwidth becomes broader on a higher frequency band side, and the entire frequency band of 0–20 kHz is divided into, for example, 25 critical bands.

Figure 1:
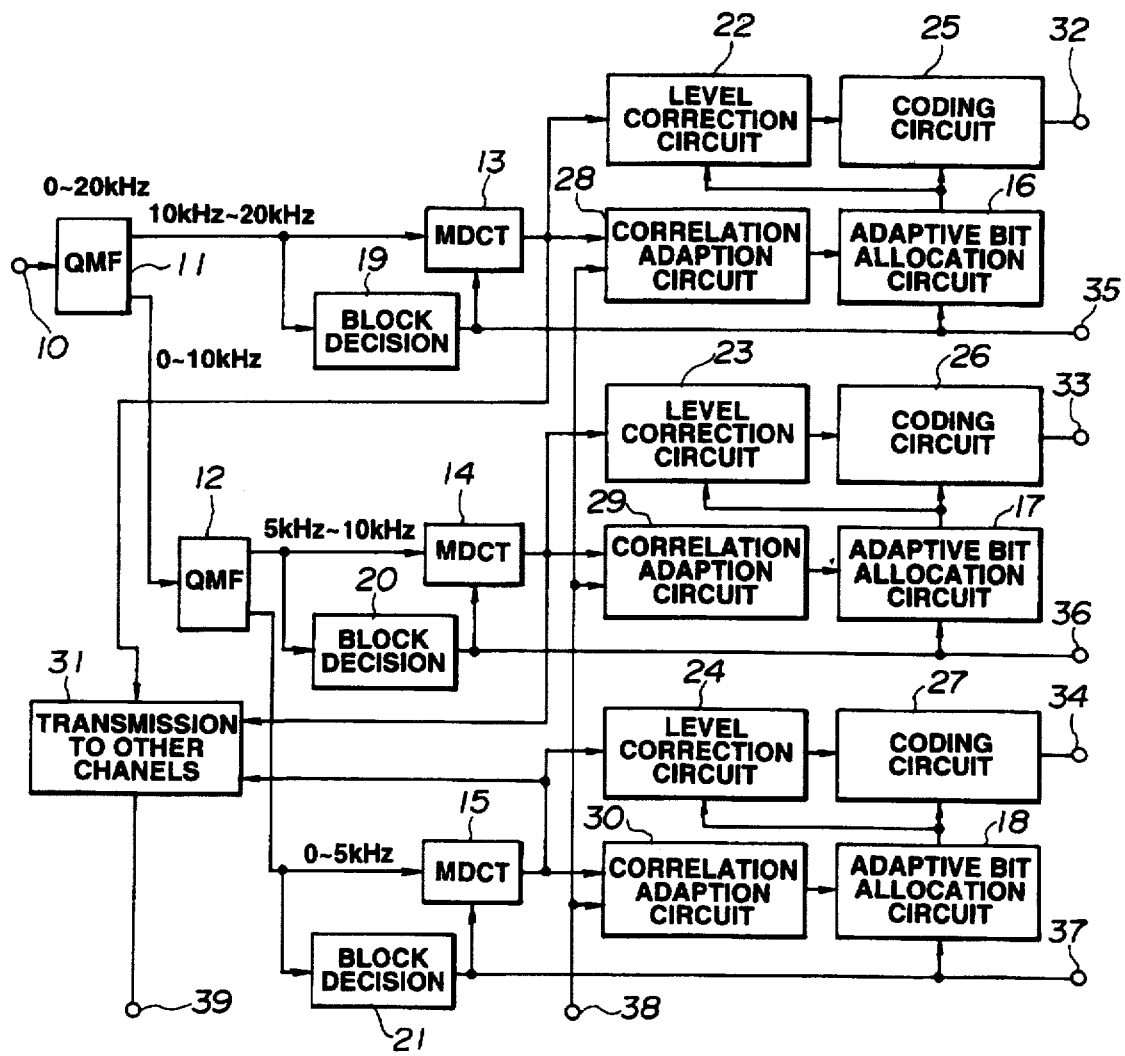
FIG. 1 is a block circuit diagram showing an arrangement of a high efficiency coding apparatus according to the present invention.
Figure 2:
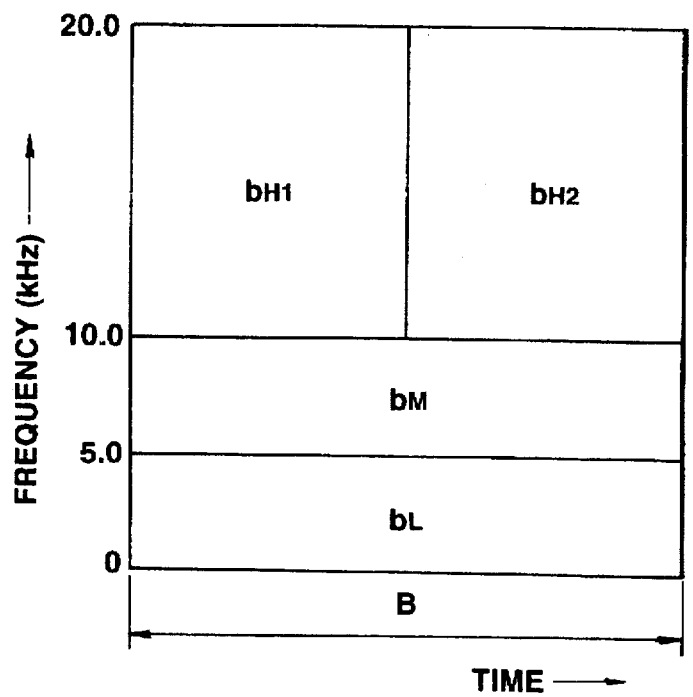
FIG. 2 is a view showing frequency and time division of a signal of the apparatus.

Namely, in FIG. 1, an input terminal 10 is supplied with, e.g., an audio PCM signal of 0–20 kHz. This input signal is divided in frequency into a frequency band of 0–10 kHz and a frequency band of 10 k–20 kHz by using a band division filter 11 such as a so-called QMF filter, and the signal in the frequency band of 0–10 kHz is further divided into a frequency band of 0–5 kHz and a frequency band of 5 k–10 kHz by using a band division filter 12 such as the so-called QMF filter. The signal in the frequency band of 10 k–20 kHz from the band division filter 11 is sent to a Modified Discrete Cosine Transform (MDCT) circuit 13 which is an example of an orthogonal transform circuit, and the signal in the frequency band of 5 k–10 kHz from the band division filter 12 is sent to an MDCT circuit 14, while the signal in the frequency band of 0–5 kHz from the band division filter 12 is sent to an MDCT circuit 15. Thus, those signals are processed by MDCT processing, respectively. A concrete example of block sizes of the respective MDCT circuits 13, 14, 15 is shown in FIG. 2. In the concrete example of FIG. 2, the frequency band is widened and the time resolution is enhanced (the block length is shortened) on the higher frequency band side.

That is, in the example of FIG. 2, MDCT processing is implemented twice in total for blocks $b_{H1}$, $b_{H2}$ of the signal in the frequency band of 10 k–20 kHz on the higher frequency band side, while MDCT processing is carried out for a block $b_L$ of a signal in the frequency band of 0–5 kHz on the lower frequency band side and a block $b_M$ of a signal in the frequency band of 5 k–10 kHz in the medium frequency band. In this manner, the number of orthogonal transform block samples in respective bands are made to be the same, thus simplifying the device, and at the same time, the frequency resolution is enhanced on the lower frequency band side where the critical bandwidth is narrow, while the time resolution is enhanced on the higher frequency band side where many components superior to a transient signal are included. In addition, in the present embodiment, the respective bands are allowed to be adaptively divided into two blocks or four blocks on the assumption that a temporal change of a signal is great.

Returning to FIG. 1, spectrum data or MDCT coefficient data on the frequency axis produced by MDCT processing in the respective MDCT circuits 13, 14, 15 are combined for every critical band or for each of the bands formed by further dividing the critical band. The data thus combined are transmitted to level correction circuits 22, 23, 24, correlation adaption circuits 28, 29, 30, and an other-channel transmission circuit 31. The correlation adaption circuits 28, 29, 30 implement modification for maintaining preferable correlation on the basis of the spectrum data on the frequency axis of another channel obtained from an input terminal 38 And the MDCT coefficient data, and then transmitting them to adaptive bit allocation circuits 16, 17, 18. For this modification, the correlation corresponding to the input signal or a fixed pattern may be used.

The other-channel transmission circuit 31 outputs from an output terminal 39 the spectrum data on the frequency axis of each band or the MDCT coefficient data as correlation information, in accordance with a data format for the use of the correlation adaption circuits and timing. The output terminal 39 is connected to the input terminal 38 of the other channel. The correlation information to be transmitted to the other channel may be constituted on the basis of floating information outputted from output terminals 35, 36, 37. The adaptive bit allocation circuits 16, 17, 18 allocate the number of bits to produce a bit rate necessary for each critical band or for each band produced by further dividing the critical band on the higher frequency band side, and transmit the data to the level correction circuit 22, 23, 24 and coding circuits 25, 26 and 27. In the level correction circuits 22, 23 and 24, quantization errors are found from the number of bits allocated by the adaptive bit allocation circuits, and according thereto, the spectrum data on the frequency axis or the coefficient data are level-corrected and transmitted to the coding circuits.

The coding circuits 25, 26 and 27 re-quantize the level-corrected spectrum data on the frequency axis or MDCT coefficient data in accordance with the number of bits allocated by the adaptive bit allocation circuits. The data thus encoded are taken out via output terminals 32, 33, 34. At the same time, floating information indicating for what magnitude of the signal normalization is carried out, and bit length information indicating at what bit length quantization is carried out, are simultaneously transmitted by the output terminals 35, 36, 37.

Figure 3:
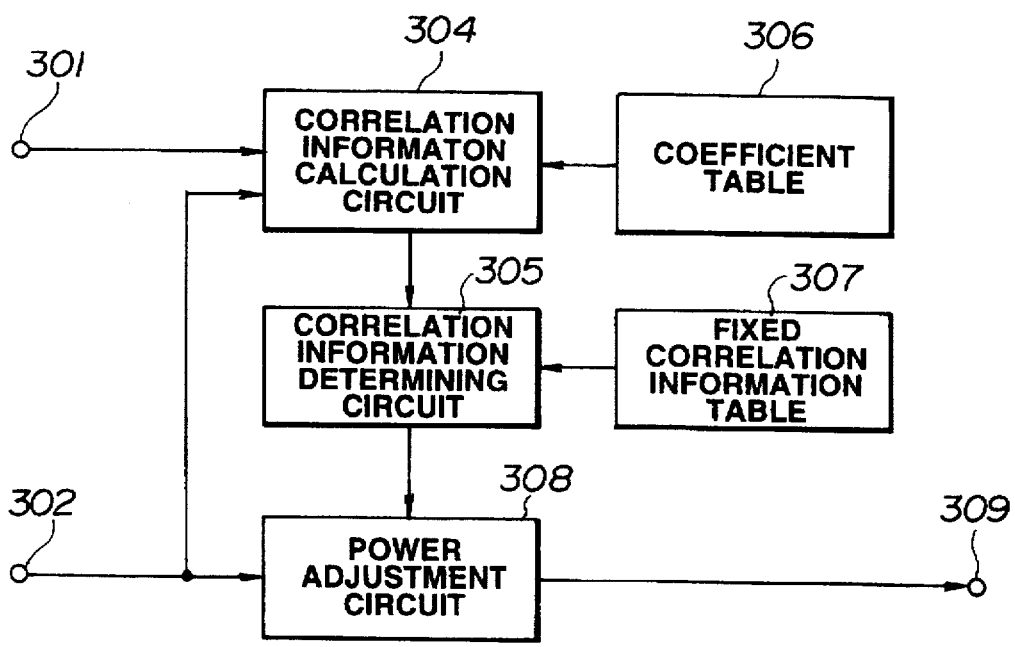
FIG. 3 is a block circuit diagram showing an arrangement of a correlation adaption circuit of the apparatus.

Outputs of the MDCT circuits 13, 14, 15 shown in FIG. 1 are transmitted to a power adjustment circuit 308 and a correlation information calculation circuit 304 via an input terminal 302 shown in FIG. 3. The information inputted to the input terminal 38 shown in FIG. 1 is transmitted to the correlation information calculation circuit 304 via the input terminal 301 shown in FIG. 3. The correlation information calculation circuit 304 calculates correlation information corresponding to the input signal by means of an input 301 and a coefficient provided by a coefficient table 306. An example of the calculation is explained on the assumption of using a normal 2-channel stereo. If the n'th spectrum power of the left channel and the n'th spectrum power Of the right channel are represented by Pl(n) and Pr(n), respectively, both being on the log scale, and the coefficient corresponding to the n'th spectrum provided by the coefficient table 306 is represented by K(n), correlation information of the respective channels $\Delta Pl(n)$, $\Delta Pr(n)$ can be found by the following formulas:

$$\Delta Pl(n) = (Pr(n) - Pl(n)) \times K(n) \quad (1)$$

$$\Delta Pr(n) = (Pl(n) - Pr(n)) \times K(n) \quad (2)$$

As is apparent from the formulas (1) and (2), the correlation information indicates that 0 expresses the strongest correlation, and that a larger absolute value of the numerical value expresses weaker correlation. The coefficient K(n) is assumed to be based on the characteristics of the human auditory sense. For example, matters concerning directional perception which have long been studied for long, and as factors thereof, intensity difference, phase difference and temporal difference in propagation of a sound to both ears are observed, are described in Dave, E. E. Jr., Gutman, N. and v. Bergeijk, W. A.: *J. Acoust. Soc. Am.*, 31, pp. 774–784 (1959). In addition to these factors, changes due to frequency and sound pressure levels are observed. Further, it is known, from every-day experience, to be difficult to specify the location of the sound source of an ultra-low or ultra-high sound. In this manner, the human directional perception changes, depending on the frequency and sound pressure of the sound. Therefore, despite a single spectrum power ratio, it is necessary to carry out correction corresponding to the frequency and sound pressure. In the calculation in this case, the correlation information may be found for each spectrum data on the frequency axis, or may be found for each floating band in quantization. Further, it is apparent that the same results can be obtained by using coefficients for floating instead of the spectrum powers.

The correlation information found by the correlation information calculation circuit 304 is transmitted to a correlation information determining circuit 305. The correlation information determining circuit 305 synthesizes fixed correlation information obtained by a fixed correlation information table 307 and correlation dependent upon the input signals obtained from the correlation information calculation circuit 304 at a constant or variable ratio, and transmits the synthesized correlation information to the power adjustment circuit 308. On the assumption of the fixed correlation information being Pfix(n), and the ratio of synthesis being R(n), where $0 \leq R(n) \leq 1.0$, the outputs Cl(n), Cr(n) of the correlation determining circuit 305 can be expressed by the following formulas:

$$Cl(n) = \Delta Pl(n) \times R(n) + Pfix(n) \times (1 - R(n)) \quad (3)$$

$$Cr(n) = \Delta Pr(n) \times R(n) + Pfix(n) \times (1 - R(n)) \quad (4)$$

The fixed correlation information in this case means peculiar correlation information which can be predicted in an applied example, and for example, such a property as to indicate strong correlation for a portion of relatively low frequency in case of using a main channel and an ultra-low sound channel. Accordingly, the fixed correlation between channels may be unpredictable, depending upon the applied example. In this case, R(n)=1.0, that is, equivalent to the above-mentioned case in which the correlation information determining circuit 305 and the fixed correlation information table 307 are omitted. On the other hand, if the correlation is clearly determined in advance, R(n)=0, that is, equivalent to the case in which the correlation information calculation circuit 304 and the coefficient table 306 are omitted. Also, the ratio of synthesis R(n) may be constant, or may be variable in accordance with the input signals, for example, the magnitude of spectrum power and frequency.

The power adjustment circuit 308 adjusts spectrum power information used in bit allocation, on the basis of the output of the correlation information determining circuit 305, and transmits the adjusted spectrum power information as an output 309 to the adaptive bit allocation circuits 16, 17, 18 shown in FIG. 1. On the assumption of information from an input terminal 302 being Pil, Pir, and information to an output terminal 309 being Pol(n), Por(n), the operation in the power adjustment circuit 308 can be expressed by the following formulas:

$$Pol(n) = (Cl(n) + 1.0) \times Pil(n) \quad (5)$$

$$Por(n) = (Cr(n) + 1.0) \times Pir(n) \quad (6)$$

Through this operation, the spectrum of strong correlation between channels is subject to a small volume of adjustment, while the spectrum of weak correlation is subject to a large amount of adjustment.

Figure 4A:
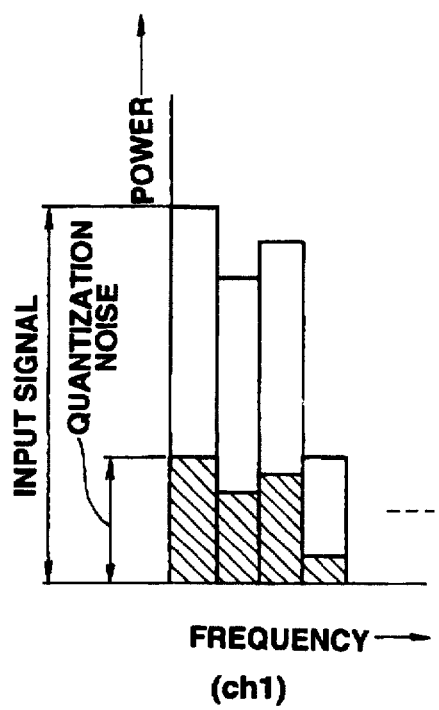
FIGS. 4A and 4B are views showing an example of bit allocation calculated separately for each channel for explaining effects of the correlation adaption circuit of the apparatus.
Figure 4B:
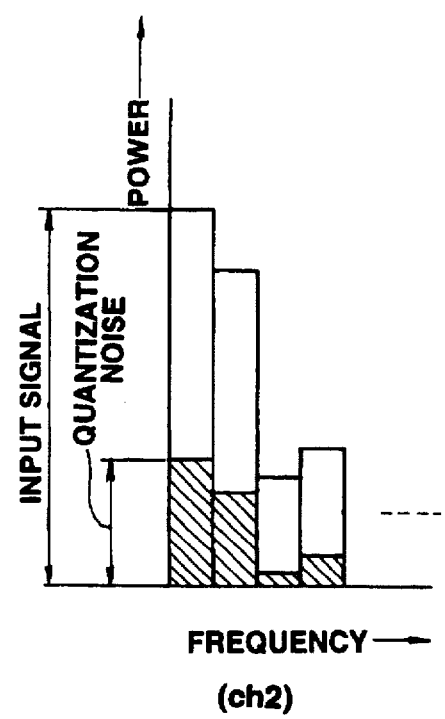
Figure 5A:
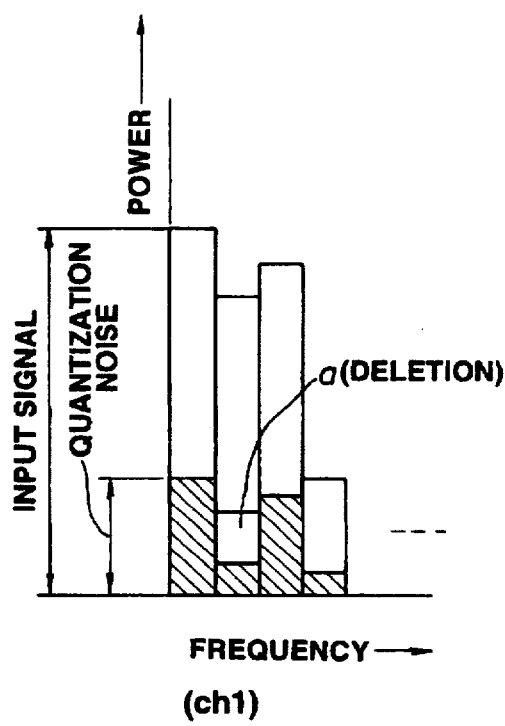
FIGS. 5A and 5B are views showing an example of bit allocation calculated in consideration of correlation information between channels for explaining effects of the correlation adaption circuit of the apparatus.
Figure 5B:
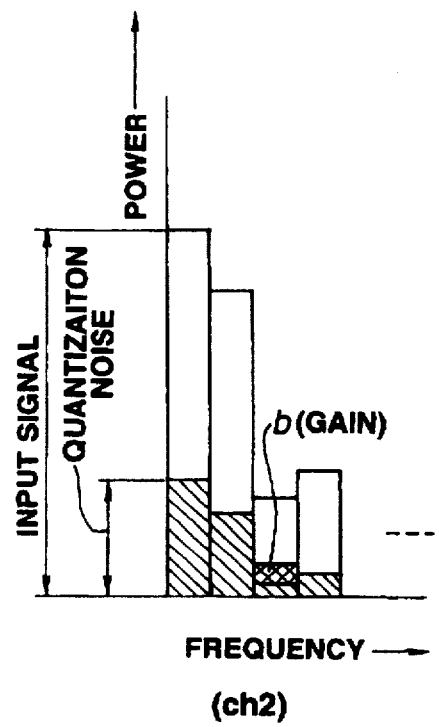

In FIGS. 4A, 4B, 5A and 5B, the function of the correlation adaption circuit is expressed in simplified models with the number of quantization bands being 4, the number of channels being 2, and the difference between the channels being only of the quantization band. In case of separately calculating bit allocations as shown in FIGS. 4A and 4B, the spectrum power of an input signal on the frequency axis is different only in the third quantization band between channel 1 and channel 2, thus having different volumes of quantization noise. In this state, for example, if the two channels are extended and reproduced as a 2-channel stereo, there is a possibility that portions different in quantization noise affect stationary quality. The correlation adaption circuit takes account of correlation between channel 1 and channel 2, as in the case in which the correlation is taken into account as shown in FIG. 5. Then, the correlation adaption circuit operates so as to control the volume of quantization noise in the third quantization band, and to reproduce high stationary quality.

What is claimed is:

1. A method for compressing digital input signals to provide compressed digital output signals, the method comprising the steps of:

deriving plural spectral coefficients from a first digital input signal, and grouping the spectral coefficients into bands, each band having a band magnitude and a band frequency;

determining a level of correlation between the first digital input signal and a second digital input signal; and adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to the level of correlation between the first digital input signal and the second digital input signal.

2. A method for compressing digital input speech signals to provide compressed digital output speech signals, the method comprising the steps of:

deriving plural spectral coefficients from a first digital input signal, and grouping the spectral coefficients into bands, each band having a band magnitude and a band frequency;

determining a level of correlation between the first digital input signal and a second digital input signal; and adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to human auditory sense characteristics, and the level of correlation between the first digital input signal and the second digital input signal.

3. The method as claimed in claim 1 or 2, wherein the level of correlation between the the first and second digital input signals is determined by constantly calculating the level of correlation between the first and second digital input signals.

4. The method as claimed in claim 1 or 2, further comprising the step of:

deriving plural spectral coefficients from the second digital input signal, and grouping the spectral coefficients into bands, each band having a band magnitude and a band frequency, wherein the level of correlation between the first and second digital input signals is determined from at least one of spectrum data on a time axis of the first and second digital input signals and the plural spectral coefficients of the first and second digital input signals.

5. The method as claimed in claim 1 or 2, wherein the correlation between the first digital input signal and the second digital input signal is determined from floating information of the second digital input signal, the floating information including information of a normalization of the second digital input signal and information of a quantization bit length of the second digital input signal.

6. The method as claimed in claim 1 or 2, wherein the adaptive allocation of a number of spectrum-dependent quantizing bits is based upon a constant level of correlation regardless of the first and second digital input signals.

7. The method as claimed in claim 1 or 2, further comprising the step of:

deriving plural spectral coefficients from the second digital input signal, and grouping the spectral coefficients into bands, each band having a band magnitude and a band frequency, wherein the adaptive allocation of a number of spectrum-dependent quantizing bits is based upon a level of correlation dependent upon one of a fixed and variable ratio of a constant level of correlation between the first and second digital input signals, upon a level of correlation determined from the plural spectral coefficients of the first and second digital input signals, upon correlation floating information of the second digital input signal, the floating information including information of the normalization of the second digital input signal and information of a quantization bit length of the second digital input signal, and upon a constant level of correlation regardless of the first and second digital input signals.

8. An apparatus for compressing digital input signals to provide compressed digital output signals, comprising:

means for deriving plural spectral coefficients from a first digital input signal and for grouping the spectral coefficients into bands, each band having a band magnitude and a band frequency;

means for determining a level of correlation between the first digital input signal and a second digital input signal; and means for adaptively allocating a number of spectrum-dependent quantizing bits for quantizing each spectral coefficient in the band, the number of spectrum-dependent quantizing bits allocated to each band being determined according to the level of correlation between the first digital input signal and the second digital input signal.

9. An apparatus for compressing digital input speech signals to provide compressed digital output speech signals, comprising:

means for deriving plural spectral coefficients from a first digital input signal, and for grouping the spectral coefficients into bands, each band having a band magnitude and a band frequency;

means for determining a level of correlation between the first digital input signal and a second digital input signal; and means for adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to human auditory sense characteristics and the level of correlation between the first digital input signal and the second digital input signal.

10. The apparatus as claimed in claim 8 or 9, further comprising:

means for determining the level of correlation between the first and second digital input signals by constantly calculating the level of correlation between the first and second digital input signals.

11. The apparatus as claimed in claim 8 or 9, further comprising:

means for deriving plural spectral coefficients from the second digital input signal and for grouping the spectral coefficients into bands, each band having a band magnitude and a band frequency; and means for determining the level of correlation between the first and second digital input signals from at least one of spectrum data on a time axis of the first and second digital input signals and the plural spectral coefficients of the first and second digital input signals.

12. The apparatus as claimed in claim 8 or 9, further comprising:

means for determining the correlation between the first digital input signal and the second digital input signal from floating information of the second digital input signal, the floating information including information of a normalization of the second digital input signal and information of a quantization bit length of the second digital input signal.

13. The apparatus as claimed in claim 8 or 9, wherein the means for adaptively allocating further comprises:

means for basing the allocation upon a constant level of correlation regardless of the first and second digital input signals.

14. The apparatus as claimed in claim 8 or 9, wherein the means for adaptively allocating further comprises:

means for deriving plural spectral coefficients from the second digital input signal and for grouping the spectral coefficients into bands, each band having a band magnitude and a band frequency; and means for quantizing each spectral coefficient based upon a level of correlation dependent upon one of a fixed and variable ratio of the constant correlation of the first and second digital input signals, upon correlation determined from the plural spectral coefficients from the first digital input signal and the plural spectral coefficients from the second digital input signal, upon correlation floating information of the second digital input signal, the floating information including information of a normalization of the second digital input signal and information of a quantization bit length of the second digital input signal, and upon a constant level of correlation regardless of the first and second digital input signals.

15. A method for compressing digital input signals to provide compressed digital output signals, the method comprising the steps of:

dividing a first digital input signal into a plurality of critical bands;

deriving plural spectral coefficients of each of the critical bands, and grouping the spectral coefficients into bands, each band having a band magnitude and a band frequency;

determining a level of correlation between the first digital input signal and a second digital input signal; and adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to the level of correlation between the first digital input signal and the second digital input signal.

16. A method for compressing digital input speech signals to provide compressed digital output speech signals, the method comprising the steps of:

dividing a first digital input signal into a plurality of critical bands;

deriving plural spectral coefficients of each of the critical bands, and grouping the spectral coefficients into bands, each band having a band magnitude and a band frequency;

determining a level of correlation between the first digital input signal and a second digital input signal; and adaptively allocating a number of spectrum dependent quantizing bits among the bands to allocate to each band a number of spectrum-dependent quantizing bits for quantizing each spectral coefficient in the band, the number of spectrum-dependent quantizing bits allocated to each band being determined according to human auditory sense characteristics and the level of correlation between the first digital input signal and the second digital input signal.

17. The method as claimed in claim 15 or 16, wherein the level of correlation between the first and second digital input signals is determined by constantly calculating the level of correlation between the first and second digital input signals.

18. The method as claimed in claim 15 or 16, further comprising the step of:

deriving plural spectral coefficients from the second digital input signal, and grouping the spectral coefficients into bands, each band having a band magnitude and a band frequency, wherein the level of correlation between the first and second digital input signals is determined from at least one of spectrum data on a time axis of the first and second digital input signals and plural spectral coefficients of the first and second digital input signals.

19. The method as claimed in claim 15 or 16, wherein the correlation between the first digital input signal and the second digital input signal is determined from floating information of the second digital input signal, the floating information including information of a normalization of the second digital input signal and information of a quantization bit length of the second digital input signal.

20. The method as claimed in claim 15 or 16, wherein the adaptive allocation of a number of spectrum-dependent quantizing bits is based upon a constant level of correlation regardless of the first and second digital input signals.

21. The method as claimed in claim 15 or 16, further comprising the step of:

deriving plural spectral coefficients from the second digital input signal, and grouping the spectral coefficients into bands, each band having a band magnitude and a band frequency, wherein the adaptive allocation of a number of spectrum-dependent quantizing bits is based upon a level of correlation dependent upon one of a fixed and variable ratio of a constant correlation between the first and second digital input signals, upon a level of correlation determined from the plural spectral coefficients of the first and second digital input signals and upon correlation floating information of the second digital input signal, the floating information including information of a normalization of the second digital input signal and information of a quantization bit length of the second digital input signal, and upon a constant level of correlation regardless of the first and second digital input signals.

22. An apparatus for compressing digital input signals to provide compressed digital output signals, comprising:

means for dividing a first digital input signal into a plurality of critical bands;

means for deriving plural spectral coefficients of each of the critical bands, and for grouping the spectral coefficients into bands, each band having a band magnitude and a band frequency;

means for adaptively allocating a number of spectrum-dependent quantizing bits among the bands to allocate to each band a number of spectrum-dependent quantizing bits for quantizing each spectral coefficient in the band, the number of spectrum-dependent quantizing bits allocated to each band being determined according to the level of correlation between the first digital input signal and the second digital input signal.

23. An apparatus for compressing digital input speech signals to provide compressed digital output signals, comprising:

means for dividing a first digital input signal into a plurality of critical bands;

means for deriving plural spectral coefficients of each of the critical bands, and for grouping the spectral coefficients into bands, each band having a band magnitude and a band frequency;

means for adaptively allocating a number of spectrum-dependent quantizing bits among the bands to allocate to each band a number of spectrum-dependent quantizing bits, quantizing each spectral coefficient in the band, the number of spectrum-dependent quantizing bits allocated to each band being determined according to human auditory sense characteristics and according to a level of correlation between the first digital input signal and the second digital input signal.

24. The apparatus as claimed in claim 22 or 23, further comprising:
means for determining the level of correlation between the first and second digital input signals by constantly calculating the level of correlation between the first and second digital input signals.

25. The apparatus as claimed in claim 22 or 23, further comprising:
means for deriving plural spectral coefficients from the second digital input signal and for grouping the spectral coefficients into bands, each band having a band magnitude and a band frequency; and
means for determining the level of correlation between the first and second digital input signals from at least one of spectrum data on a time axis of the first and second digital input signals and the plural spectral coefficients of the first and second digital input signals.

26. The apparatus as claimed in claim 22 or 23, further comprising:
means for determining the correlation between the first digital input signal and the second digital input signal from floating information of the second digital input signal, the floating information including information of a normalization of the second digital input signal and information of a quantization bit length of the second digital input signal.

27. The apparatus as claimed in claim 22 or 23, wherein the means for adaptively allocating further comprises:
means for basing the allocation upon a constant level of correlation regardless of the first and second digital input signals.

28. The apparatus as claimed in claim 22 or 23, wherein the means for adaptively allocating further comprises:
means for deriving plural spectral coefficients from the second digital input signal and for grouping the spectral coefficients into bands, each band having a band magnitude and a band frequency; and
means for quantizing each spectral coefficient based upon a level of correlation dependent upon one of a fixed and variable ratio of the constant correlation of the first and second digital input signals, upon correlation determined from the plural spectral coefficients from the first digital input signal and the plural spectral coefficients from the second digital input signal, upon correlation floating information of the second digital input signal, the floating information including information of a normalization of the second digital input signal and information of a quantization bit length of the second digital input signal, and upon constant level of correlation regardless of the first and second digital input signals.

29. An apparatus for compressing digital input signals to provide compressed digital output signals, comprising:
means for dividing a first digital input signal into a plurality of critical bands;
block decision means for generating floating information from each of the plurality of critical bands, the floating information including information of the normalization of the first digital input signal and information of the bit length of the first digital input signal;
means for deriving plural spectral coefficients of each of the critical bands and for grouping the plural spectral coefficients into bands, each band having a band magnitude and a band frequency based in part upon the floating information;
level correction means for correcting data levels within each critical band;
adaptive bit allocation means for determining the number of bits to be allocated to each critical band;
means for determining a level of correlation between the first digital input signal and a second digital input signal;
correlation adaption means for adjusting the number of bits to be allocated by the adaptive bit allocation means based upon the level of correlation between the first digital input signal and a simultaneously coded second digital input signal; and
means for re-quantizing the level corrected data within each critical band in response to the determination of the adaptive bit allocation means.

30. The apparatus of claim 29, wherein the correlation adaption means comprises:
correlation information calculation means for calculating correlation information based upon a predetermined set of coefficients contained within a coefficient table, the coefficient data of each critical band of the first digital input signal, and coefficient data of each critical band derived from the second digital input signal;
correlation information determining means for synthesizing correlation information based upon fixed correlation information obtained from a fixed correlation information table and upon calculation correlation information from the correlation information calculation means; and
power adjustment means for adjusting spectrum power information on the basis of the synthesized correlation information, the power adjusted synthesized correlation information coupled to the adaptive bit allocation means for adjusting the number of bits allocated to plural spectral coefficients of each critical band.

31. A method for compressing digital input signals to provide compressed digital output signals, the method comprising the steps of:
dividing a first digital input signal into a plurality of critical bands;
generating floating information from each of the plurality of critical bands, the floating information including information of a normalization of the first digital input signal and information of a bit length of the first digital input signal;
deriving plural spectral coefficients of each of the critical bands based in part upon the floating information;
correcting data levels within each critical band;
determining the number of bits to be allocated to the derived plural spectral coefficients of each critical band;
determining a level of correlation between the first digital input signal and a second digital input signal;
adjusting the determined number of bits to be allocated to the derived plural spectral coefficients of each critical band based upon the level of correlation between the first digital input signal and a second digital input signal; and
re-quantizing the level corrected data within each critical band in response to the determination of the number of bits to be allocated to the derived plural spectral coefficients of each critical band.

32. The method of claim 31, wherein the step of adjusting the determined number of bits to be allocated to the derived plural spectral coefficients of each critical band, further comprises the steps of:

calculating correlation information based upon a predetermined set of coefficients contained within a coefficient table, the coefficient data of each critical band of the first digital input signal, and coefficient data of each critical band of the second digital input signal derived from orthogonal transformation of the second digital input signal;

synthesizing correlation information based upon fixed correlation information obtained from a fixed correlation information table and upon the determined level of correlation; and adjusting spectrum power information on the basis of the synthesized correlation information, the power adjusted synthesized correlation information coupled to adjust the number of bits allocated to orthogonally transformed signals within each critical band.

* * * * *